March 17, 1931. A. M. NIVEN 1,796,472
SLEEVE VALVE ENGINE
Filed July 18, 1927
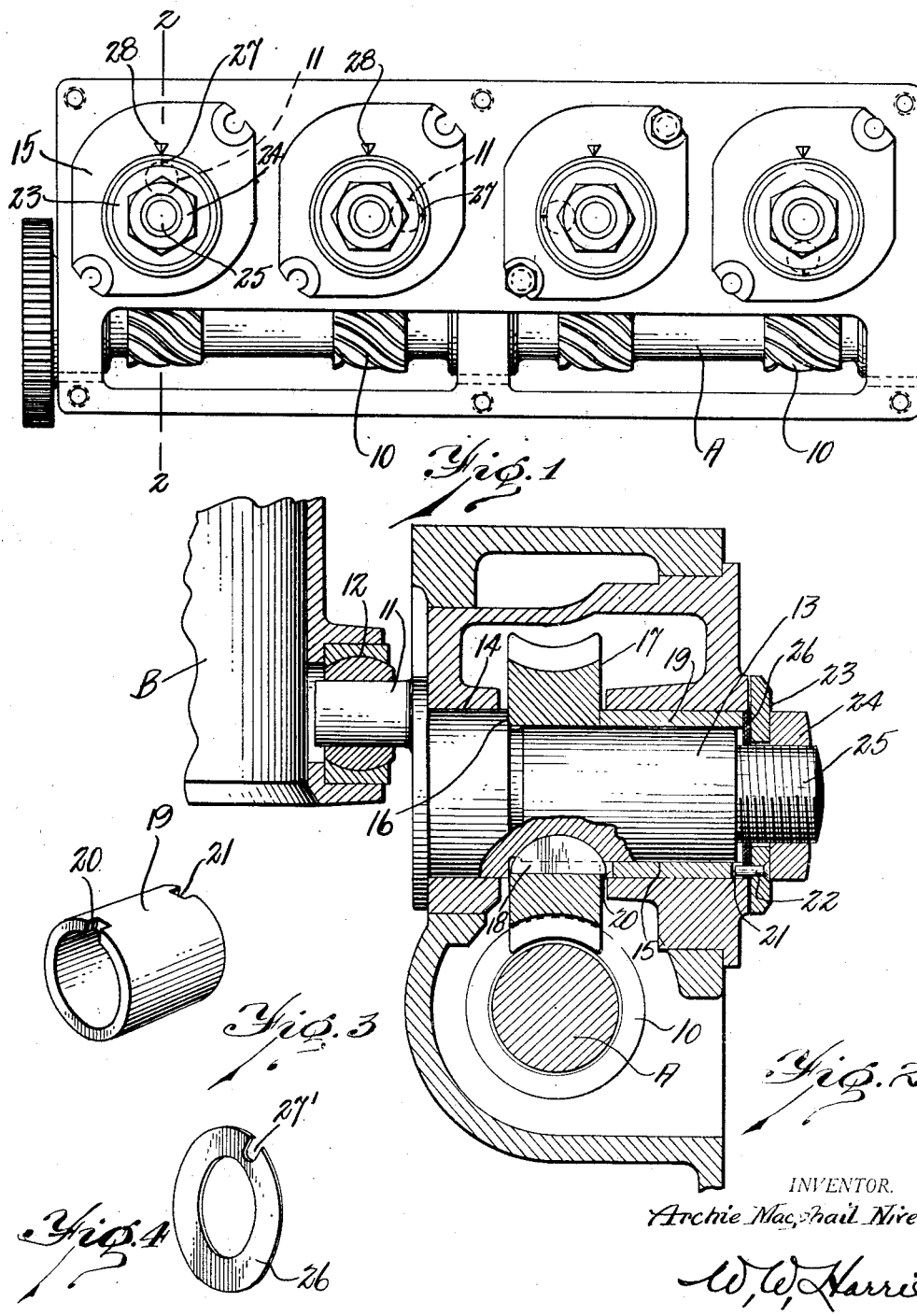
INVENTOR.
Archie MacPhail Niven
W. W. Harris
ATTORNEY.

Patented Mar. 17, 1931

1,796,472

UNITED STATES PATENT OFFICE

ARCHIE MACPHAIL NIVEN, OF DETROIT, MICHIGAN, ASSIGNOR TO CONTINENTAL MOTORS CORPORATION, OF DETROIT, MICHIGAN, A CORPORATION OF VIRGINIA

SLEEVE-VALVE ENGINE

Application filed July 18, 1927. Serial No. 206,423.

This invention relates to sleeve valve engines and refers more particularly to an improved driving mechanism for the "Burt-McCollum" type of engine in which a single sleeve valve is moved in a combined reciprocating and oscillating path with respect to the axis of the sleeve and cylinder in accordance with well known practice at this time.

One of the objects of my invention resides in providing improved means for locating and assembling the driven gear or worm wheel ordinarily operating on a cross shaft between the valve layshaft which carries the driving gear or worm and the sleeve valve.

A further feature of my invention resides in a novel combination and arrangement of sleeve driving parts permitting convenient and accurate timing of the various cylinders of the engine.

With these and other objects in view my invention further resides in the novel combination and arrangement of parts more particularly hereinafter described and claimed.

In the drawings in which like reference characters indicate corresponding parts throughout the several views, Fig. 1 is a side elevation view of the sleeve driving mechanism, Fig. 2 is a sectional view through 2—2 of Fig. 1, Fig. 3 is a perspective view of the clamping spacer for the worm wheel, and Fig. 4 is a perspective view of one of the clamping shims for the spacer.

In the drawings reference character A represents the usual valve layshaft carrying driving gears or worms 10 spaced in accordance with the number of engine cylinders. A typical driving assembly is shown in Fig. 2, the sleeve valve B being driven by crank 11 through the ball and socket 12, the crank 11 being slidable in the ball to impart the desired movement to the sleeve as will be readily understood.

The crank 11 may be formed on cross shaft 13 rotatable in bearings 14 and 15. The shaft 13 is formed with a shoulder 16 for locating the driven gear or worm wheel 17 keyed at 18 to the shaft 13. Intermediate bearing 15 and shaft 13 is a bushing 19 formed with end notches 20 and 21, the notch 20 receiving an end of the key 18 and the notch 21 receiving a pin 22 carried by the plate 23 visible from the outside of the engine assembly. A nut 24 threadedly engages the reduced end 25 of shaft 13 and serves to hold the parts in assembled relation. Thus the nut 24 holds the plate 23 in position adjacent the outer face of bearing 19 and also, preferably through the clamping shims 26 and bushing 19, locates the worm wheel 17 in clamped position against the shoulder 16. The shims 26 may be notched at 27' to receive the pin 22. The shims 26 permit adjustment to obtain the desired working clearance for the parts as will be readily understood; the shims also space the plate 23 slightly in front of the outer face of the bearing 15.

The keyway, for key 18, is formed in each worm wheel 17 in the same definite angular relation to any reference tooth or tooth space common to the worm wheels. Also the keyway, for key 18, is formed in each shaft 13 in the same definite angular relation to the corresponding crank 11, as 180° therefrom as shown. The notches 20, 21 of spacer 19 are preferably in line longitudinally of the spacer and since the notch 20 engages key 18 it follows that in any of the sleeve drive assemblies, the pin 22 will transfer and establish the corresponding crank position at a point visible outside the engine. The valve layshaft is timed with the engine crankshaft in the usual manner. The pistons being in a definite relation to the usual crankshaft and valve layshaft geared therewith it is apparent that with any piston in a definite position as at top dead center, it is a simple and convenient matter to properly time the sleeve valve by noting the position of the pin 22 which bears a definite angular relation with the crank 11. In practice I find it convenient to place timing marks 27 at the periphery of the plate 23 in a definite angular relation to pins 22, so as to more conveniently note the position of the corresponding sleeve crank. Fixed timing marks 28 may be located preferably in the same relative positions on the outer faces of bearings 15. Thus the engine may be readily and conveniently timed by starting with the first cylinder in the firing order with the piston thereof at top dead center, preferably of compression stroke, in which position the sleeve drive unit is meshed with the worm 10 with the timing marks 27 and 28 for this unit assembly in registration. The crankshaft is then preferably turned over until the next cylinder in the firing order has its piston at top dead center, of compression stroke (90° in a four cylinder engine), when its sleeve drive unit is meshed with the corresponding worm 10 with the timing mark 27 registered with the mark 28 as before. This operation is repeated for the remaining cylinders, the timing marks for each drive unit being successively registered with the fixed timing marks at which time the worm and worm wheels of the respective units are meshed. While in operation the visible rotating timing marks 27 may be compared with each other and with the fixed visible reference timing marks 28 to determine whether the sleeves are operating properly for the desired timing order notwithstanding the normal invisibility of the sleeve driving mechanism from the engine exterior. Thus for illustration in the four cylinder engine illustrated in Fig. 1 the proper timing reading from left to right is shown for a firing order 1—3—4—2, the rotation of the crank pins being clockwise.

Instead of locating the fixed timing marks 28 at the same relative positions and turning over the engine crankshaft to bring each successive piston to top dead center in the order of firing, the timing marks 28 might be angularly retarded successively in the firing order whereby, with the first piston at top dead center, the gears of the driving units may be successively meshed by registering the fixed, angularly spaced timing marks with the timing marks 27. The arrangement shown is preferred however since it is convenient to bring the successive pistons to top dead center, the usual flywheel fixed with the crankshaft, being customarily provided with marks indicating such piston positions.

What I claim as my invention is:

1. In a sleeve valve internal combustion engine the combination of a single sleeve valve, a valve layshaft, a driving gear carried by the layshaft, a driven shaft connected to impart a combined reciprocating and oscillating movement to the sleeve, gear locating means on said driven shaft, a driven gear secured to the driven shaft and driven from said driving gear, and means including an element engageable with the driven gear for clamping the gear in position on the driven shaft by cooperation with the said gear locating means.

2. In a sleeve valve internal combustion engine the combination of a single sleeve valve, a valve layshaft, a driving gear carried by the layshaft, a driven shaft connected to impart a combined reciprocating and oscillating movement to the sleeve, said driven shaft having a reduced portion forming a shoulder, a driven gear on said driven shaft receiving the drive from said driving gear, a bushing providing a bearing for the driven shaft, and means acting on said bushing to move the same longitudinally of the driven shaft for locating and clamping the driven gear against said shoulder.

3. In a sleeve valve internal combustion engine the combination of a single sleeve valve, a valve layshaft, a driving gear carried by the layshaft, a driven shaft connected to impart a combined reciprocating and oscillating movement to the sleeve, said driven shaft formed with a shoulder, a driven gear, a key securing the driven gear with the driven shaft, and an element surrounding the driven shaft adopted to clamp the gear against the shoulder, said element being driven by the said key.

4. In a sleeve valve internal combustion engine the combination of a single sleeve valve, a valve layshaft, a driving gear carried by the layshaft, a driven shaft connected to impart a combined reciprocating and oscillating movement to the sleeve, said driven shaft formed with a shoulder, a driven gear, a key securing the driven gear with the driven shaft, a bushing for the driven shaft and a nut threadedly engaging the driven shaft and acting to move the bushing longitudinally for locating and clamping the driven gear against the shoulder.

5. In a sleeve valve engine the combination of a single sleeve valve, a valve drive shaft, a driven shaft, a crank operated by the driven shaft and engageable with the sleeve for imparting thereto a combined reciprocating and oscillating movement, driving and driven gears on said driving and driven shafts respectively, means locating said gear on the driven shaft in a definite predetermined angular relation with said crank, said crank and driven gear being normally concealed from view, means including an element rotatable with the crank and driven gear and located within view from the engine exterior whereby the said angular relation of the crank and driven gear may be identified, and means locating said element in predetermined angular position relative to the driven gear.

6. In a sleeve valve engine the combination of a single sleeve valve, a valve drive shaft, a driven shaft, a crank operated by the driven shaft and engageable with the sleeve for imparting thereto a combined reciprocating and oscillating movement, driving and driven gears on said driving and driven shafts respectively, means locating said gear on the driven shaft in a definite predetermined angular relation with said crank, said crank and driven gear being normally concealed from view, a bushing for the driven shaft fixed in a predetermined angular relation with the driven gear to rotate therewith, and means visible from the engine exterior fixed in a predetermined angular relation with the bushing to rotate therewith whereby the position of the crank may be readily ascertained.

7. In a sleeve valve engine the combination of a single sleeve valve, a valve drive shaft, a driven shaft, a crank operated by the driven shaft and engageable with the sleeve for imparting thereto a combined reciprocating and oscillating movement, driving and driven gears on said driving and driven shafts respectively, a key locating said gear on the driven shaft, in a predetermined angular relation with the crank, said crank and driven gear being normally concealed from view from the engine exterior, a bushing surrounding the driven shaft and having one end slotted for engagement with said key, said bushing having its opposite end slotted at a predetermined point in a definite angular relation with the first said slot, a plate located within view from the exterior of the engine, and means rotatably connecting the plate and bushing in a definite angular relation with the bushing whereby a point on the plate will bear a definite predetermined angular relation with the crank.

8. In a sleeve valve engine the combination of a single sleeve valve, a valve drive shaft, a driven shaft, a crank operated by the driven shaft and engageable with the sleeve for imparting thereto a combined reciprocating and oscillating movement, driving and driven gears on said driving and driven shafts respectively, a key locating said gear on the driven shaft in a predetermined angular relation with the crank, said crank and driven gear being normally concealed from view from the engine exterior, a bushing surrounding the driven shaft and having one end slotted for engagement with said key, said bushing having its opposite end slotted at a predetermined point in a definite angular relation with the first said slot, a plate located within view from the exterior of the engine, means rotatably connecting the plate and bushing in a definite angular relation with the bushing whereby a point on the plate will bear a definite predetermined angular relation with the crank, a shim between the plate and bushing, said shim being engaged by said connecting means so as to rotate with the plate and bushing, and means engaging the driven shaft for acting on the plate to clamp the gear in position on the driven shaft.

9. In a sleeve valve internal combustion engine the combination of a single sleeve valve, a valve layshaft, a driving gear carried by the layshaft, a driven shaft connected to impart a combined reciprocating and oscillating movement to the sleeve, said driven shaft formed with a shoulder, a driven gear, a key securing the driven gear with the driven shaft, a bushing for the driven shaft, a plate surrounding the shaft, a shim intermediate the plate and bushing, clamping means for the gear engageable with the driven shaft and acting on the plate, and driving means connecting the plate and and bushing, said shim having a clearance for said driving means.

10. The combination with an engine, sleeve valve and actuating means therefor including driving and driven gears, said actuating means being normally concealed from view from the engine exterior, of means including an element rotatable with the driven gear, said element bearing identifying means visible from the engine exterior for determining the angular position of the driven gear by inspection, and means locating the said element in predetermined angular position relative to the driven gear.

11. The combination with an engine sleeve valve and actuating means therefor including driving and driven members, said actuating means being normally concealed from view from the engine exterior, of means including an element rotatable with the driven member, said element bearing identifying means visible from the engine exterior for determining the angular position of the driven member by inspection, and means locating the said element in predetermined angular position relative to the driven member.

12. In a sleeve valve engine, a sleeve valve, a valve layshaft, driving mechanism intermediate the layshaft and sleeve for imparting movement to the sleeve from the layshaft, a sleeve position indicating element, and driving instrumentalities intermediate the said driving mechanism and said element for moving said element in a predetermined relation with respect to the movement of the sleeve.

In witness whereof, I hereunto subscribe my name this 14th day of July, A. D. 1927.

ARCHIE MACPHAIL NIVEN.